July 24, 1956  R. D. BOGER  2,756,093
BED COMPARTMENTS FOR THE CABS OF TRAILER TRUCKS
Filed Nov 17, 1952  3 Sheets-Sheet 1
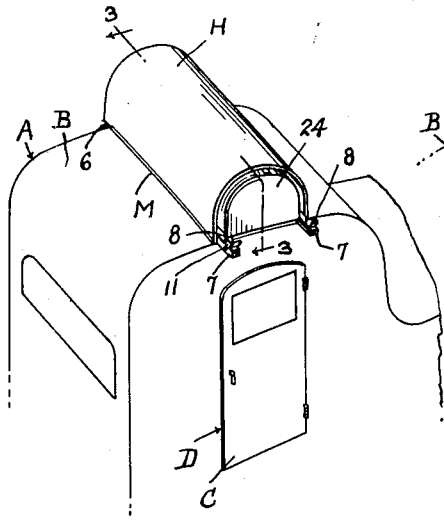
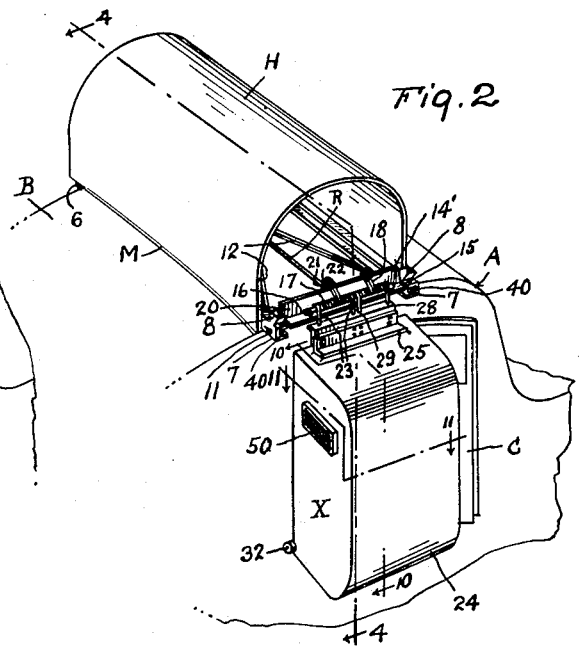
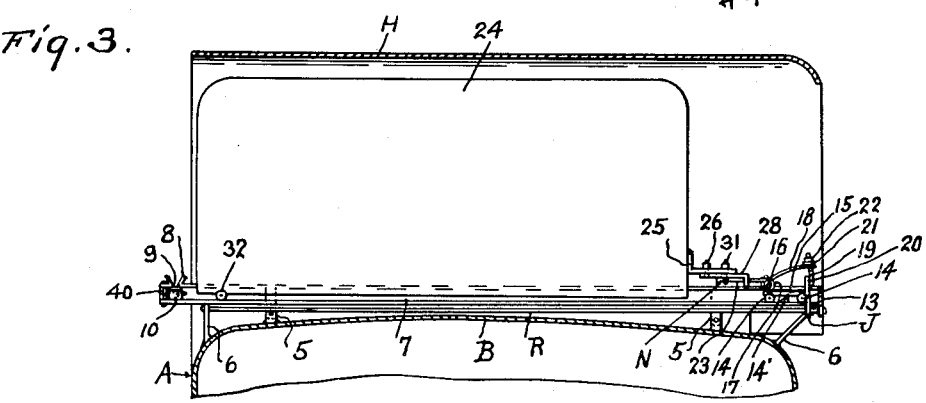
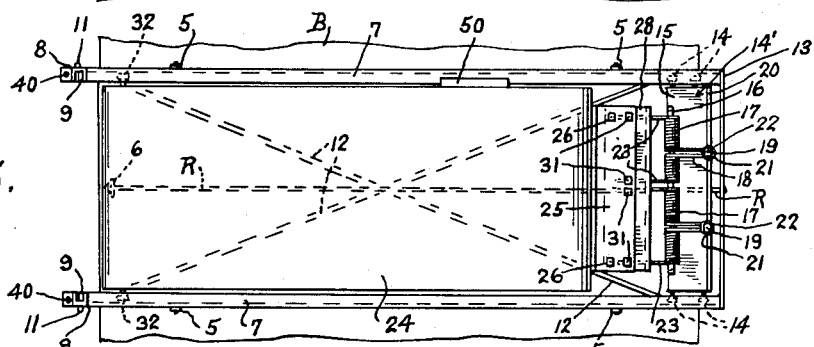
INVENTOR.
Russell D. Boger
BY L. B. James
ATTORNEY.

July 24, 1956 R. D. BOGER 2,756,093
BED COMPARTMENTS FOR THE CABS OF TRAILER TRUCKS
Filed Nov 17, 1952 3 Sheets-Sheet 2
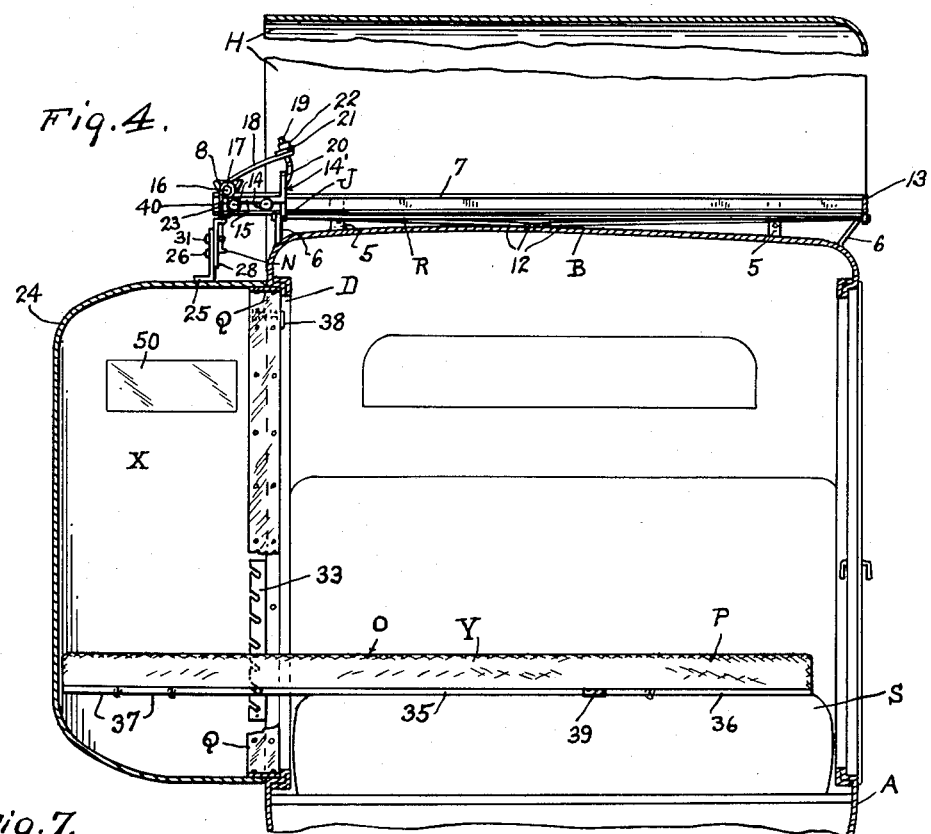
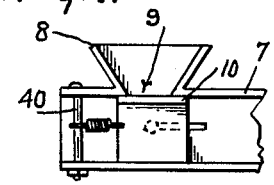
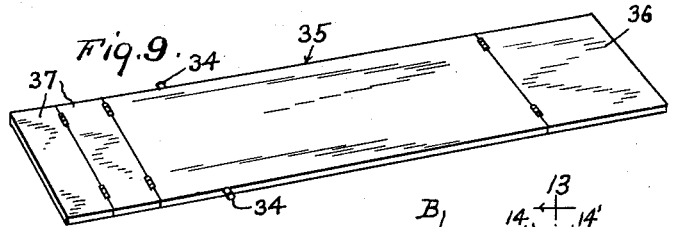
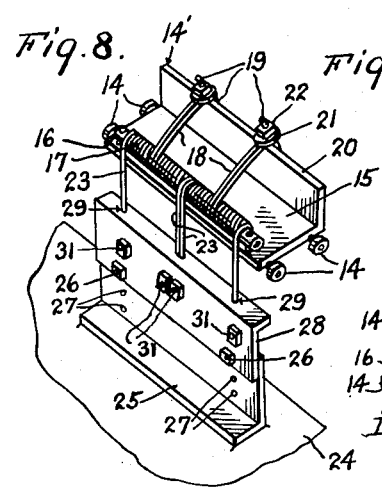
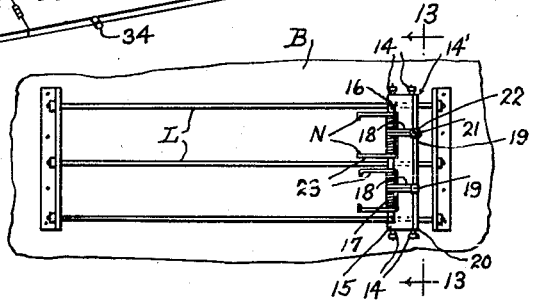
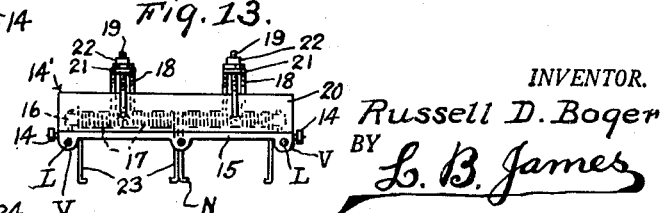
INVENTOR.
Russell D. Boger
BY L. B. James
ATTORNEY.

July 24, 1956 R. D. BOGER 2,756,093
BED COMPARTMENTS FOR THE CABS OF TRAILER TRUCKS
Filed Nov 17, 1952 3 Sheets-Sheet 3
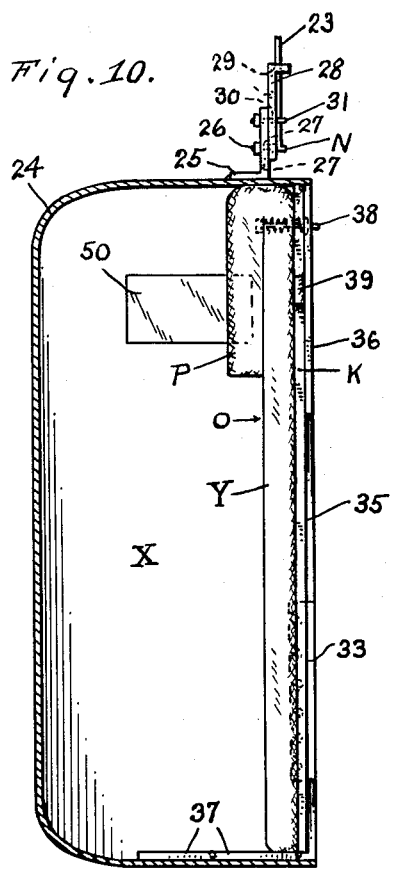
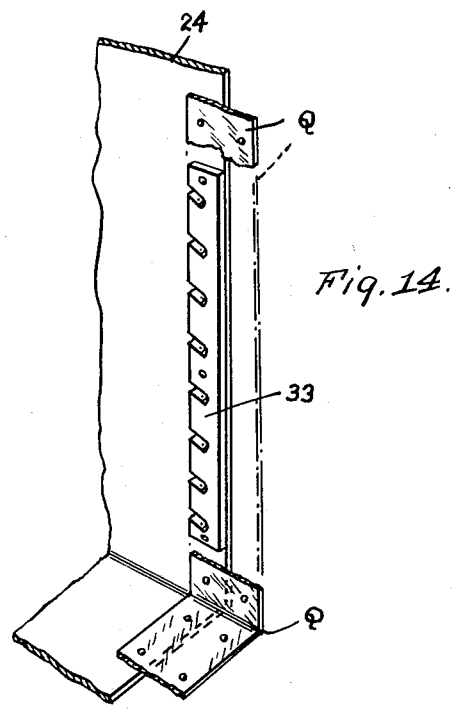
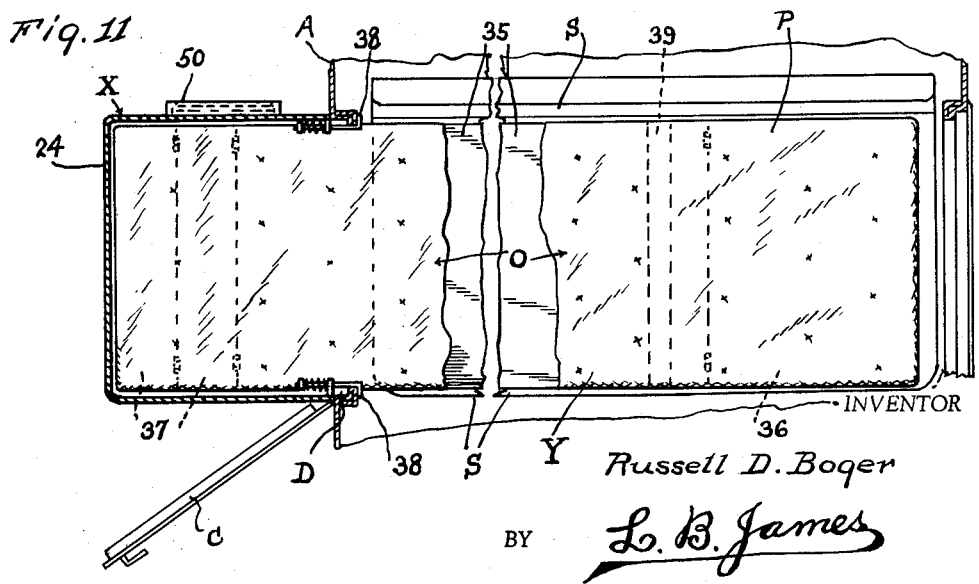
INVENTOR
Russell D. Boger
BY L. B. James
ATTORNEY.

United States Patent Office 2,756,093
Patented July 24, 1956

2,756,093

BED COMPARTMENTS FOR THE CABS OF TRAILER TRUCKS

Russell D. Boger, Fort Wayne, Ind.

Application November 17, 1952, Serial No. 320,890

9 Claims. (Cl. 296—23)

This invention relates to automobile trucks and particularly a new and novel bed compartment for the driver's cab thereof.

The primary object of this invention resides in the provision of a bed compartment for the cabs of automobiles and trailer trucks and adapted to easily and quickly convert the driver's seat into a comfortable sleeping bed.

Another object of this invention resides in the provision of a bed compartment for the cabs of automobile trailer trucks adapted to be easily and safely stored on the top of the cab while travelling and easily and quickly disposed in operative position in the right door opening therein by a single driver.

A further object of this invention resides in the provision of a bed compartment for the cabs of automobile trailer trucks adapted to be safely disposed on top of the cab and protected against inclement weather conditions while travelling.

A still further object of this invention resides in the provision of a bed compartment for the cabs of automobile trailer trucks and having an elongated mattress adapted to rest on the driver's cushion thereof so as to permit the occupant thereof to lie thereon in a fully stretched out position while sleeping.

Aside from the foregoing objects, this invention resides in the particular means whereby the bed compartment is slidably disposed on the top of the cab and easily brought into such position over the doorway thereof as to form a weatherproof closure for receiving a portion of an elongated mattress support with a mattress thereon.

In addition to the foregoing objects this invention resides in the particular construction of the mattress support or panel.

Among the many objects of this invention is the particular construction of the compartment supporting carriage.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application;

Fig. 1 is a perspective view of the cab and automobile trailer truck showing the bed compartment disposed in inoperative position on the top thereof.

Fig. 2 is a similar view showing the bed compartment disposed in operative position over the door opening of the cab.

Fig. 3 is a cross sectional view taken approximately on line 3—3 of Fig. 1.

Fig. 4 is a similar view taken approximately on line 4—4 of Fig. 2.

Fig. 5 is a plan view of the cab with the hood removed and showing the bed compartment in inoperative position on the tracks.

Fig. 6 is an enlarged perspective view of a portion of the tracks.

Fig. 7 is a side view of a portion of one track showing the latch thereof.

Fig. 8 is an enlarged perspective view of the carriage with a portion of the bed compartment connected thereto.

Fig. 9 is a perspective view of the mattress supporting panel.

Fig. 10 is an enlarged vertical sectional view taken approximately on line 10—10 of Fig. 2 with the mattress and supporting panel thereof folded in inoperative position within the compartment.

Fig. 11 is a horizontal sectional view taken approximately on line 11—11 of Fig. 2.

Fig. 12 is a plan view of a modified form of the tracks.

Fig. 13 is a cross sectional view thereof taken approximately on line 13—13 of Fig. 12.

Fig. 14 is an enlarged perspective view of a portion of the bed compartment shown in Fig. 4, showing particularly a rack plate and weatherstripping on the edge of the compartment.

In the present embodiment of this invention, the letter A designates the driver's cab of a trailer truck which, among other well known elements, includes a top B and hinged door C adapted to fit over a doorway D in the usual manner.

Rigidly secured on the top of the cab, as by brackets 5 and braces 6 are parallel tracks 7 preferably formed of laterally extending channel bars having their open sides disposed in opposed relation. Said tracks are provided at their ends with upstanding guide plates 8 diverging from entrance openings 9 which are normally closed by spring actuated latches 10 adapted to be manually manipulated or opened through the instrumentality of knobs 11 connected thereto within convenient reach of the cab driver.

Extending diagonally to the tracks with their ends secured thereto are suitable brace rods 12 while connecting those ends thereof opposite said openings 9 is a brace bar 13 adapted to close the open ends of the channel shaped tracks.

Slidably disposed in the channels of the tracks, as by sets of rollers 14, is a carriage 14' including a horizontal base member 15 supporting an elongated cylindrical tube 16 on which is loosely disposed companion coil springs 17 having their medial convolutions bent to form looped arms 18 which receive threaded studs 19 secured to a vertical member 20 formed on the base member and provided with washers 21 and nuts 22 to adjust their arms 23 and balance the weight of a hood shaped bed compartment 24 supported thereby.

Secured to the inner or upper end of the bed compartment is an angle iron plate 25 to which is adjustably attached, as by fastening elements 26 extending through selected aligned holes 27 therein, a companion angle iron plate 28 provided with apertures 29 to receive the ends of the springs and other apertures 30 to accommodate suitable fastening bolts 31 adapted to adjustably secure the springs thereto so the bed compartment will neatly fit the doorway in the cab when initially assembled thereon and seal or close it whenever brought into operative position over the same. Said ends of the springs are preferably bent, as indicated by the letter N to prevent the bed compartment from slipping from the same should the bolts 31 become loosened.

Disposed on opposite outer sides of the bed compartment adjacent that end thereof to which the springs are attached are anti-friction rollers 32 adapted to traverse the side of the cab while being disposed over the doorway therein and inserted through the opening 9 in the tracks subsequent to pushing the carriage therealong with the latches in open position.

Secured to the inner surfaces of the side walls of the bed compartment adjacent its open end are opposed rack plates 33 adapted to adjustably receive pivotal pins 34 carried by a foldable mattress supporting panel 35 partially resting on the conventional cushion seat S of the cab with a certain foldable portion thereof extending into the compartment. Said panel includes a hinged leaf member 36 which rests on the seat cusion when in operative position and hinged companion leaf members 37 adapted to extend into the bed compartment to support an elongated mattress O to increase the sleeping area within the cab.

Prior to removing the bed compartment from the doorway of the cab for disposition on top thereof, the inner portion P of the mattress is folded on the body portion Y thereof while the leaf 36 is folded in the opposite direction against the body portion K of the panel, whereupon the same together with the mattress is swung into the open end of the bed compartment and locked therein by a suitable latch 38 to form a closure. During the swinging or closing action of the panel with the mattress retained thereon by a cross strap 39 the leaf members 37 will follow the contour of the opposed wall of the bed compartment and automatically fold against the body portion of the panel.

In order to limit outward movement of the carriage, stop bolts 40 or other suitable elements are secured in the channels of the tracks adjacent the openings therein.

Formed on the lower surface of the carriage approximately midway between its opposite ends is a guide sleeve J adapted to slide on a stabilizer rod R extending between the tracks to obviate the twisting action of the carriage while disposed in inoperative position on top of the cab.

In order to protect the bed compartment from inclement weather conditions while disposed on the cab, a hood H or housing is secured to the tracks and provided with weather strips M along its edges to seal the same to the top of the cab. Further, the edges of the bed compartment are also provided with weather strips Q to safeguard the interior of the cab against exterior inclement weather conditions while in operative or sleeping position relative to the doorway of the cab.

In order that the driver of the truck will be provided with fresh air while sleeping in the cab and protected from annoyance by flying insects, the rear side X of the bed compartment is provided with a suitable screened and glassed window 50.

In the modified form of the tracks as shown in Figs. 11 and 12 of the drawing, the carriage is provided with laterally spaced sleeves V adapted to slide on rods L which are rigidly secured to the top of the cab by any suitable means.

With this invention fully set forth it is manifest that means are provided whereby drivers of long distance trailer trucks or the like can park the same alongside of highways or other suitable places of convenience and easily convert the driver's cab into comfortable sleeping quarters and, through the instrumentality of the associated elements herein set forth and their equivalents, the cost of manufacture of the bed compartment in its entirety will not only be cheap but the bed compartment may be readily installed on a cab.

Having thus described my invention what I claim and desire to protect by Letters Patent is:

1. The combination with a trailer truck including a cab having a doorway therein, a hood shaped bed compartment removably closing the doorway when in operative position with respect to the cab, tracks rigidly secured on the top of the cab, a carriage slidably mounted on the tracks, yielding means connecting the carriage to the bed compartment, a mattress panel hingedly mounted in the bed compartment and resting on the driver's seat within the cab with a portion thereof extending within the bed compartment, a mattress removably resting on the aforesaid panel, rollers mounted on opposite side of the bed compartment adapted to ride on the tracks when the bed compartment is in inoperative position thereon, a screened window in the rear side of the bed compartment, weather strips sealing the edges of the bed compartment to the edges of the doorway, and an enclosure on the top of the cab and covering the tracks for receiving the bed compartment when in inoperative position on the tracks.

2. The combination with a trailer truck including a driver's cab having a seat and doorway therein, channel shaped tracks disposed on top of the cab and extending laterally thereof with portions of the same disposed over the sides of the doorway of the cab, brackets adjustably securing the tracks to the top of the cab subsequent to adjusting them thereon, openings in the upper members of the channel shaped tracks adjacent those ends thereof over the aforesaid doorway of the cab, guide plates formed on said members of the tracks and diverging from said openings, manually operated closures normally closing said openings, a cross bar securing those ends of the tracks opposite the aforesaid openings, crossed brace bars connecting the tracks, a carriage including anti-friction rollers slidably mounted in the channels of the tracks, stop bolts disposed across the channels of the tracks outwardly of the openings therein, an elongated tubular bar secured to the carriage adjacent its outer edge, threaded studs secured to the carriage adjacent its inner edge and extending on an arcuate line toward the outer edge of the carriage, companion coil springs loosely journalled on said elongated bar and having looped medial portions receiving the aforesaid studs with their opposite ends extending approximately at right angles to their looped portions and extremities bent, washers disposed on said studs and resting on the looped portions of said springs, nuts threaded on the studs against said washers, a hood shaped bed compartment including a screened window removably disposed over the doorway of the cab, an elongated plate secured to the upper end of the bed compartment adjacent its inner edge, a second plate adjustably secured to the first mentioned plate, means adjustably connecting the end portions of the springs to said second plate inwardly of the bent extremities thereof, a guide rod supported above the top of the cab and extending between the tracks, a guide sleeve formed on the carriage and slidably mounted on said guide rod, opposed rack bars secured to the inner sides of the bed compartment adjacent its open side, a mattress supporting panel including hinged members pivotally and adjustably connected to said racks with its major portion resting on a seat cushion within the cab and its minor portion extending into the bed compartment, an elongated mattress removably and foldably disposed on said panel, a looped strap secured to the mattress and extending beneath a portion of said panel, a bed compartment receiving housing secured to the tracks and having its lower edges sealed to the top of the cab against inclement weather conditions, weather strips sealing the inner edges of the bed compartment to the sides of the cab doorway against inclement weather conditions, and rollers secured to opposite outer sides of the bed compartment adjacent its lower end adapted to enter said opening in the tracks when sliding the bed compartment into inoperative position on the tracks and within the housing.

3. The combination with the cab of a trailer truck, a carriage, coiled springs carried by the carriage and having arms extending from certain convolutions thereof, a hood shaped bed compartment connected to the arms of said spring, carriage guides rigidly secured to the top of the cab and slidably supporting the carriage thereon, rollers on the bed compartment engaging said guides when in inoperative position thereon, a foldable and adjustable mattress panel pivotally carried by the bed compartment and forming an extension to a driver's seat within the cab when in operative position therein, a foldable mattress removably carried by the panel, a latch locking the panel and mattress within the compartment when in inoperative position, and weather strips sealing the space between the bed compartment and cab when in operative position relative to a doorway in the cab for providing a bedroom-like enclosure which is comprised of both the compartment and the cab.

4. The combination with the cab of a trailer truck, a bed compartment removably disposed to cover the doorway of an open door in the cab, horizontally disposed companion coil springs having their ends connected to and yieldingly and adjustably supporting the bed compartment, a carriage supporting the coil springs, an adjustable and foldable mattress panel pivotally carried within the bed compartment and resting on a seat cushion within the cab when in operative position, track secured to the top of the cab and slidably supporting the carriage thereon, rollers on the exterior of the bed compartment resting against the side of the cab when in operative position to cover said open door and engaging the tracks when the bed compartment is disposed in inoperative position on top of the cab, and stabilizing means connected to the carriage to prevent twisting movement thereof on its supports.

5. The combination with the cab of a trailer truck having an open doorway in one side thereof, a bed compartment disposed to cover the doorway of the cab, parallel tracks rigidly secured on the top of the cab, a carriage slidably mounted on the tracks, and means connecting the bed compartment to the carriage and yieldably forcing the compartment against the cab adjacent the edges of the doorway whereby a bedroom-like enclosure is provided which is comprised conjointly of said compartment and said cab.

6. A device of the character described adapted for converting the cab of a motor vehicle into a relatively large and enclosed sleeping enclosure comprising hood-shaped means adapted to be moved into registry with an open cab doorway for converting the cab into said enclosure, said hood-shaped means having bottom and side portions, a carriage hingedly secured to said means and adapted to support the latter with respect to said doorway, and guide means operatively supporting said carriage and adapted to be secured to the roof of a cab, said carriage being movable on said guide means for operating said hood-shaped means into and out of registry with said doorway, said guide means including a receiving portion adapted to receive said hood-shaped means upon swinging the latter with respect to said carriage into a predetermined position and moving said carriage on said guide means in a direction to position said hood-shaped means into said receiving portion.

7. A device of the character described adapted for converting the cab of a motor vehicle into a relatively large and enclosed sleeping enclosure comprising hood-shaped means adapted to be moved into registry with an open cab doorway for converting the cab into said enclosure, said hood-shaped means having bottom and side portions, a carriage secured to said means and adapted to support the latter with respect to said doorway, and guide means operatively supporting said carriage and adapted to be secured to the roof of a cab, said carriage being movable on said guide means for operating said hood-shaped means into and out of registry with said doorway, said guide means including a receiving portion adapted to receive said hood-shaped means upon swinging the latter with respect to said carriage into a predetermined position and moving said carriage on said guide means in a direction to position said hood-shaped means into said receiving portion.

8. A device of the character described adapted for converting the cab of a motor vehicle into a relatively large and enclosed sleeping enclosure comprising hood-shaped means adapted to be moved into registry with an open cab doorway for converting the cab into said enclosure, a carriage hingedly secured to said means and adapted to support the latter with respect to said doorway, and guide means operatively supporting said carriage and adapted to be secured to the roof of a cab, said carriage being movable on said guide means for operating said hood-shaped means into and out of registry with said doorway.

9. The combination with the cab of a trailer truck, a bed compartment removably disposed to cover the doorway of an open door in the cab, horizontally disposed companion coil springs having their ends connected to and yieldingly and adjustably supporting the bed compartment, a carriage supporting the coil springs, tracks secured to the top of the cab and slidably supporting the carriage thereon, and stabilizing means connected to the carriage to prevent twisting movement thereof on its supports.

References Cited in the file of this patent

UNITED STATES PATENTS

| | | |
|---|---|---|
| D. 168,440 | Flatt | Dec. 23, 1952 |
| 1,243,288 | Hall | Oct. 16, 1917 |
| 1,413,890 | Bartholomew | Apr. 25, 1922 |
| 1,834,489 | Hauber | Dec. 1, 1931 |
| 2,012,193 | Heinsen | Aug. 20, 1935 |
| 2,209,659 | Mercer | July 30, 1940 |
| 2,348,306 | Parsons | May 9, 1944 |
| 2,506,870 | Hairston | May 9, 1950 |
| 2,521,815 | Will | Sept. 12, 1950 |
| 2,533,683 | Neuhaus | Dec. 12, 1950 |
| 2,676,839 | Lacoste | Apr. 27, 1954 |